Patented Jan. 12, 1943

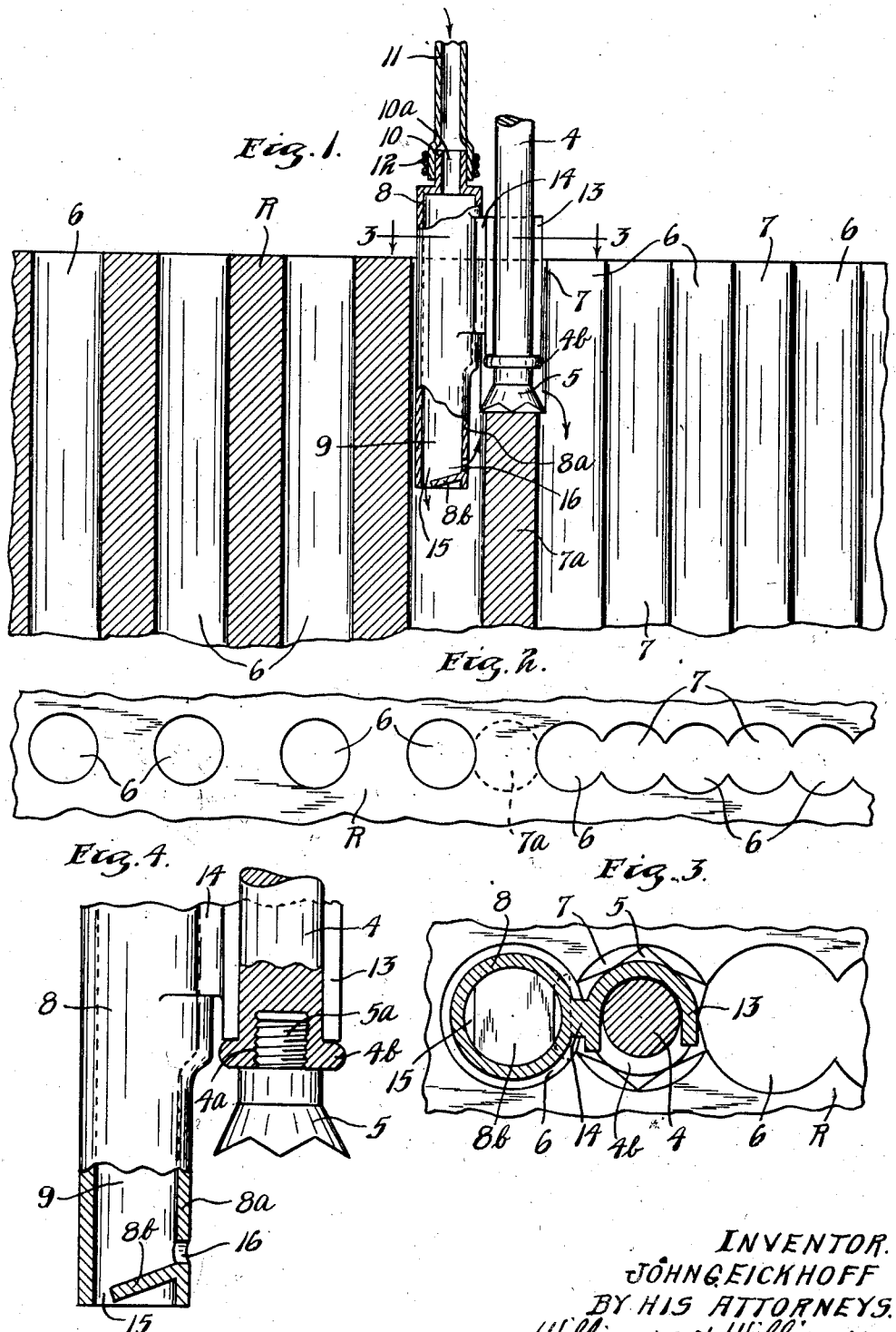

2,308,067

UNITED STATES PATENT OFFICE 2,308,067

QUARRYING TOOL FOR BROACH DRILLING

John G. Eickhoff, Cold Spring, Minn.

Original application August 16, 1939, Serial No. 290,390. Divided and this application November 20, 1940, Serial No. 366,349

3 Claims. (Cl. 255—62)

This application is a division of my co-pending application, Serial Number 290,390, filed August 16, 1939, U. S. Patent 2,236,399, dated March 25, 1941, entitled "Drill guide."

My present invention relates to rock drills, and particularly to guides therefor to be used in interlapping or broach drilling of rock from a quarry.

In quarrying operations it is common practice to cut blocks of rock from the main body thereof by drilling series of spaced parallel bores in the rock and then drilling additional bores between the interlapping into the bores of said series. In drilling the above mentioned additional bores, difficulty is frequently encountered due to the drill working toward and into a bore of the original series instead of following a line parallel to and midway between two bores of the original series. Also, accumulation of dust and granular products of a drilling operation in a bore being drilled tends to interfere with the drilling operation.

An object of my invention is to provide a device capable of use to effectively and relatively accurately guide a drill in drilling of parallel interlapping bores.

Another object is to provide such a device constructed to enable a drill to be quickly and easily placed in or removed from operative relation therewith.

More specifically, it is an object to provide with an efficient drill guiding device for broach drilling, simple but highly efficient structure embedded in the shank of the drill or bit for supporting the guide device with freedom of movement of the drill and for permitting the guide device to move downwardly with the cutter head during the progress of drilling.

Another object is the provision of an improved drill or bit construction for cooperative use with a broach drilling guide having efficient supporting means fixed or preferably integrally formed with the shank of the bit and independent of the cutting head thereof for properly supporting the guide device during broach drilling operations.

These and other objects and advantages of my invention will more fully appear from the following description made in connection with the accompanying drawing, wherein like reference characters refer to the same parts throughout the several views, and in which:

Fig. 1 is a partially broken away, partially sectional side view of an embodiment of my invention shown in association with a drill and a rock strata in which drilling operations are being performed;

Fig. 2 is a top view of the strata of rock shown in Fig. 1, showing completion of several broach drilling operations;

Fig. 3 is a sectional view taken on the line 3—3 of Fig. 1 as indicated by the arrows and drawn on a larger scale, and Fig. 4 is a fragmentary view in side elevation with some portions broken away illustrating my improved bit with replaceable cutting head and drill guide supporting means.

Referring to the drawing, an embodiment of my invention is shown associated with a rock drill of the general type used in stone quarries having an elongated, solid cylindrical shank 4 on the lower end of which an enlarged cutting head 5 is replaceably secured, as shown, by means of an externally threaded, axially extending stud 5a which is received in the internally threaded socket 4a at the lower end of the drill shank 4, it being, of course, apparent that the attachment elements may be reversed and the threaded stud provided at the lower end of the drill shank while the detachable cutter head is provided with a threaded socket to receive said stud. The lower portion of drill shank 4 is also provided with a radially enlarged drill guide supporting element or bead 4b preferably, though not necessarily, integrally formed with the drill shank 4. The combination of my drill guide and drill is shown in operative relationship in broach drilling a stratum of rock R.

In quarrying operations it is customary in making a cut in a body of rock to first drill a series of holes or bores 6 which are disposed parallel to each other and are spaced apart by a suitable distance. After this original series of holes has been drilled, other holes 7 are drilled between the holes of the original series in interlapping relation therewith so that the holes 6 and 7 are all in communication with each other and constitute a cut in the mass 5 of material. In drilling the holes 7 of the second series thereof the drill 4 is operated to remove a body of material such as that indicated by dotted lines at 7a. In drilling out the body of material 7a the drill has a tendency to be displaced sidewardly into one or the other immediately adjacent holes or bores 6 of the original series. It is this displacement of the drill which my device is designed to prevent.

My device includes an elongated body 8 preferably of generally cylindrical shape adapted to slide longitudinally in one of the bores 6 of the original series thereof. The member 8 is provided with an interior space or passage 9 adapted for transmitting a fluid such as air or water. At its upper end the member 8 is provided with an upwardly extending neck 10 which is vertically apertured to form an inlet port 10a for fluid under pressure. A flexible conduit 11 may be telescoped on to the inlet neck 10 and may be secured thereon by suitable means such as wire bands 12 tightly encircling the exterior of the portion of the conduit 11 located on the neck 10.

Means for guiding a drill is carried by the member 8. This means may and preferably does consist of a U-shaped guide 13 disposed parallel to the upper end of the member 8 and extending upwardly above the upper end of the member 8. The U-shaped guide 13 is so positioned that the open side thereof faces in a direction normal to a vertical plane containing the longitudinal axes of the member 8 and the guide 13. The guide 13 has internal dimensions such that the shank 4 of a drill to be used with the guide will be closely but slidably contained in the interior space of the guide 13. The guide 13 is rigidly connected with the member 8 by means of a vertically disposed element 14 extending between the member 8 and the guide 13 and preferably formed integrally therewith. The distance between the axes of the member 8 and the guide 13 is such that the axis of a drill shank 4 will be equidistant between the axes of the two adjacent bores 6 of the previously described original series of bores when the member 8 is disposed in one bore of said pair.

The lower portion of the member 8 is cut away or flattened at the side thereof nearest the guide 13 at 8a to provide clearance between the member 8 and the enlarged head 4a of a drill. This cutting away or flattening of the member 8 also provides a fluid passage between the lower portion of the member 8 and the body 7a of material to be removed.

The lower end of the member 8 includes a bottom wall 8b which preferably slopes upwardly toward the right as viewed in the drawing. A fluid outlet port 15 is formed in the left-hand portion of the bottom wall or closure 8b of the member 8. Another fluid outlet port 16 is formed in the peripheral wall of the member 8 in the flattened portion 8a thereof and immediately above the bottom wall or closure 8b.

The fluid outlet ports 15 and 16, the passage 9, and the fluid inlet port 10a constitute means for handling a fluid in such a manner as to blow or flush away particles and chips of material removed from the body of material 7a by the enlarged cuttting head 5 of a drill.

In operation of the device, the device and a drill 4 are associated with a stratum of rock R, as shown in Fig. 1, the mass of rock R previously having had the original series of spaced bores 6 drilled therein. Obviously the drill shank 4 is free to move vertically in the guide 13, but cannot move relative thereto in a direction either toward or away from the bores 6 disposed at respective sides of the body of material 7a on which the drill is working. As the drill progresses downwardly the member 8 slides downwardly by gravity. It also should be apparent that the drill shank 4 may be readily placed in or removed from the guide 13 by sideward movement relative thereto when the drill 4 and my device are not in association with a mass of material such as the stratum of rock R.

The entire drill guiding apparatus is supported by engagement of the yoke 13 from the radial enlargement or bead 4b formed in the lower end of the drill shank 4, a downward thrust friction thereby being removed from the cutter head 5 while permitting free reciprocation or oscillation of the drill and cutter head within the yoke 13.

A source of fluid under pressure is connected by means of the conduit 11 to the fluid inlet port 10a of the member 8. This fluid will fill the interior of the member 8 and will be expelled out of the member 8 through the fluid outlet ports 15 and 16. Fluid coming out of the lower fluid outlet port will fill the interior of the bore 6 below the member 8 and being under pressure will flow upwardly through the passage between the flattened portion 8a of the member 8 and the body of material 7a on which the drill is working. Fluid issuing from the right-hand fluid outlet port 16 is deflected and carried upwardly along with fluid which has issued from the port 15 as previously described. This fluid from port 16 is directed against the rock immediately below the cutting head to keep it cool. The fluid will rise and will pass to the right past the enlarged cutting head 5 of the drill to cool the same and to carry the dislodged grains and chips of material into the bores 6 and 7 to the right of the drill. Thus the drill will be kept clear of cuttings which would interfere with the operating efficiency of the drill, and the maintenance of lower temperatures will lengthen the effective life of the cutting head. If the fluid used is air, the dislodged material will be blown away and if the fluid used is water, the material will be flushed away from the cutting head 5. From the standpoint of eliminating dust at the scene of the drilling operation use of water is preferable to use of air, but it is sometimes necessary to use air under pressure where the atmospheric temperature goes considerably below freezing. In extremely cold weather, water would freeze in the bores and completely halt the drilling operation.

The structure of my improved drill bit and its cooperation with the guide device is responsible for materially improved results. As previously stated, the drill guide is entirely supported from the radial enlargement 4b at the lower end of the shank of the drill. This radial enlargement, preferably integrally formed with the shank of the drill, is engaged by the yoke 13 and receives the thrust and hammering action in a reciprocating type drill, and in an oscillatory or rotary drill receives the wear and thrust while providing a good bearing surface. Thus the thrust imposed by the weight of the drill guide device and the impact in reciprocating drills are not placed upon the cutting head 5 with the result that the cutting head is not readily subject to crystallization, wear or as high temperatures as if the cutter head proper supported the drill guide. The guide supporting enlargement 4b further strengthens the lower end of the drill shank and facilitates the formation of a threaded socket for receiving the attachment stud of the replaceable cutter head, as shown.

Bits having replaceable cutter heads have decreased cost and increased efficiency in rock drilling operations. With the use of my improved structure with the guide supporting enlargement has proved to be an important improvement in broach drilling operations.

It will, of course, be understood that various changes may be made in the form, details, proportions and arrangements of the several parts without departing from the scope of my invention.

What is claimed is:

1. In combination with a drill guide for broach drilling having a member adapted to slide longitudinally in a completed bore and also having a member rigidly connected therewith for embracing the shank of a drill bit; a drill bit comprising, an elongated shank, a radial enlargement at the lower portion of said shank adapted to support said embracing member, and a cutter head connected with the lower end of said shank and disposed below said radial enlargement.

2. In combination a drill having an elongated shank and a cutting head at the lower end thereof, a drill guiding device for broach drilling operations having a body longitudinally slidable in a completed bore and having a guide element at least partially embracing the shank of said drill and a drill guiding device supporting member mounted on the lower portion of said shank above said cutting head and engaging said guide element to support said entire drill guiding device.

3. In combination an elongated cylindrical drill shank, a cutting drill head removably connected to the lower end of said shank, a drill guiding device for broach drilling operations having a body longitudinally slidable in a completed bore and having a guide element at least partially embracing said shank and a drill guiding device supporting member integrally formed with said shank and projecting radially outwardly therefrom at the lower portion thereof above said cutting head and engaging said guide element to support said entire drill guiding device.

JOHN G. EICKHOFF.